No. 872,819.    
PATENTED DEC. 3, 1907.
M. H. ITTNER.
CAKE OF SHAVING SOAP.
APPLICATION FILED MAR. 9, 1906.
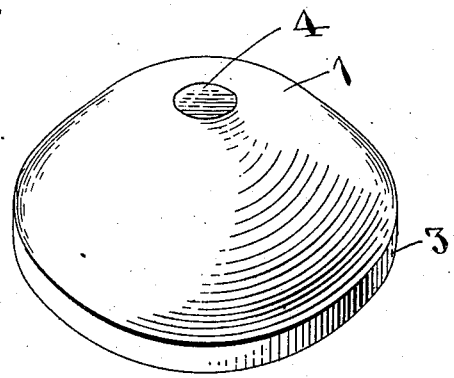
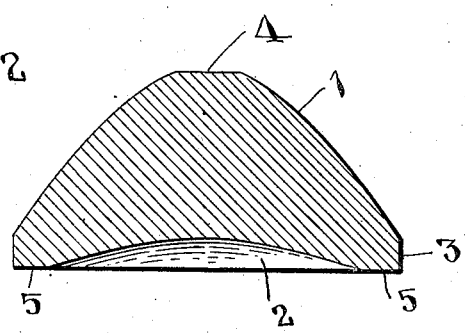
WITNESSES:
Edw. W. Vaill Jr.
John W. Pitters.
INVENTOR.
Martin H. Ittner
BY Betts Sheffield Betts
ATTORNEY.

UNITED STATES PATENT OFFICE.

MARTIN H. ITTNER, OF JERSEY CITY, NEW JERSEY, ASSIGNOR TO COLGATE & CO., OF NEW YORK, N. Y., A FIRM.

CAKE OF SHAVING-SOAP.

No. 872,819.　　　　Specification of Letters Patent.　　　　Patented Dec. 3, 1907.

Application filed March 9, 1906. Serial No. 305,040.

*To all whom it may concern:*

Be it known that I, MARTIN H. ITTNER, a citizen of the United States, and a resident of Jersey City, State of New Jersey, have invented certain new and useful Improvements in Cakes of Shaving-Soap, of which the following is a full, clear, and complete disclosure.

Briefly, my invention comprises a cake of soap for shaving purposes which is made of a peculiar and novel shape in order that said cake may be firmly held in place during shipment and may also be efficiently and evenly used when placed in the usual shaving mug or cup and so that the same may be held within said mug or cup without danger of becoming loosened.

My invention comprises certain details of construction and form to be more particularly pointed out in the following specification and claimed in accompanying claims.

For a full, clear and exact description of this form of my invention, reference may be had to the following specifications and to the accompanying drawing in which Figure 1 is a perspective view of my improved cake of shaving soap, and Fig. 2 is a central, vertical, sectional view thereof.

As shown in the drawings, the upper surface, 1, of the cake is curved so that its sectional outline is in the form shown, or constantly diminishing in cross section upwardly. The bottom surface, 2, of the cake is also preferably curved or recessed in a form similar to the upper surface, but the curve thereof is of a considerably greater radius, thereby forming a shallower arc. The horizontal outline of the cake is preferably circular in form, in other words, sections through the cake at right angles to the axis thereof are circles. The edge of the cake, adjacent to the points where the curved surface 1 and the bottom would ordinarily meet, is made cylindrical in form, as shown at 3, thus providing a narrow, cylindrical, marginal surface. The apex of the curve, 1, is slightly flattened, forming a substantially plane surface of a comparatively small diameter, which does not destroy the general outline and appearance of the cake as indicated at 4, and is in a plane substantially parallel with the plane of the lower edge of the cylindrical portion, 3. The base preferably has a flat annular margin 5.

As above made, my improved cake of soap has several advantages over those ordinarily produced in addition to the advantages arising from cakes of soap having the curved upper and lower surfaces as shown. One of the advantages resides in the cylindrical surface forming the edge of my improved cake of soap. This edge allows the cake to be molded without danger of having the margin of the cake split or broken owing to extreme thinness. Said cylindrical edge also allows the cake to be removed from the mold without injury to, or distortion of the form of the cake. The cylindrical edge is also of a great advantage in packing the cake in boxes, as the cylindrical edge butts against an adjacent cylindrical edge of another cake or other cakes, so that the cakes in such box or receptacle are held securely in position. The flattened top, 4, of the cake, may also contact with a similar flattened portion of an adjacent cake or the bottom of an adjacent cake, so that the cakes do not have a tendency to become twisted or displaced within the box or receptacle in which they were packed, the cylindrical portion together with the flattened portion of the top preventing the cakes from sliding about in the receptacle and thereby abrading the surface and injuring the outline of said surface or dulling their polished appearance.

Having thus described this form of my invention, what I claim and desire to protect by Letters Patent is:

A cake of soap, the base of which presents the greatest diameter of the cake, said diameter and the contour of the base adapting said base for closely conforming to the angle at the bottom and sides of a usual shaving mug, said cake diminishing in cross section upwardly from a narrow vertical margin which bounds said base, the apex of said cake being formed by a small plane surface parallel to the plane of the base, substantially as described.

In witness whereof I have signed my name to this specification in the presence of two witnesses, this 8th day of March, 1906.

MARTIN H. ITTNER.

Witnesses:
　JAMES J. COSGROVE,
　EDW. W. VAILL, Jr.